US009081181B2

United States Patent
Lee

(10) Patent No.: US 9,081,181 B2
(45) Date of Patent: Jul. 14, 2015

(54) HEAD MOUNTED DISPLAY DEVICE AND IMAGE DISPLAY CONTROL METHOD THEREFOR

(75) Inventor: Woo Cheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 13/475,259

(22) Filed: May 18, 2012

(65) Prior Publication Data

US 2012/0293407 A1    Nov. 22, 2012

(30) Foreign Application Priority Data

May 19, 2011    (KR) .................. 10-2011-0047203

(51) Int. Cl.
| | | |
|---|---|---|
| G09G 5/00 | (2006.01) | |
| G02B 27/01 | (2006.01) | |
| H04N 13/00 | (2006.01) | |
| H04N 13/04 | (2006.01) | |

(52) U.S. Cl.
CPC .......... *G02B 27/017* (2013.01); *H04N 13/0022* (2013.01); *H04N 13/044* (2013.01); *G02B 2027/014* (2013.01); *G02B 2027/0187* (2013.01); *H04N 2213/002* (2013.01)

(58) Field of Classification Search
CPC .............................. G02B 27/107; G06F 3/013
USPC ............... 345/8, 156; 359/630; 600/544, 558
See application file for complete search history.

(56) References Cited

U.S. PATENT DOCUMENTS

| | | | | |
|---|---|---|---|---|
| 5,715,384 | A  * | 2/1998 | Ohshima et al. | 345/428 |
| 6,307,526 | B1 * | 10/2001 | Mann | 345/8 |
| 6,414,681 | B1 * | 7/2002 | Ohshima et al. | 345/428 |
| 6,483,484 | B1 * | 11/2002 | Yamazaki et al. | 345/8 |
| 6,501,536 | B1 * | 12/2002 | Fredricks | 356/3.01 |
| 6,634,749 | B1 * | 10/2003 | Morrison et al. | 351/209 |
| 6,735,517 | B2 * | 5/2004 | Engelsberg et al. | 701/437 |
| 6,760,020 | B1 * | 7/2004 | Uchiyama et al. | 345/419 |
| 7,372,987 | B2 * | 5/2008 | Tokuhashi et al. | 382/154 |
| 2006/0061544 | A1 | 3/2006 | Min et al. | |
| 2008/0088529 | A1* | 4/2008 | Tang | 345/8 |
| 2010/0185113 | A1* | 7/2010 | Peot et al. | 600/544 |
| 2011/0221656 | A1* | 9/2011 | Haddick et al. | 345/8 |

* cited by examiner

*Primary Examiner* — Quan-Zhen Wang
*Assistant Examiner* — Calvin C Ma
(74) *Attorney, Agent, or Firm* — Jefferson IP Law, LLP

(57) ABSTRACT

A Head Mounted Display (HMD) device and an image display control method are disclosed. The device includes a display unit including a left display and a right display for a left eye and a right eye for displaying images for the left eye and the right eye, a vital reaction sensor unit including a first vital reaction sensor for the left eye and a second vital reaction sensor for the right eye, detecting vital reaction changes of a user viewing the left display and the right display, and generating, when a vital reaction change is detected, an interruption signal including coordinates of a position at which the vital reaction change is detected, and a control unit for outputting images for the left eye and the right eye to the display unit.

20 Claims, 9 Drawing Sheets

<3a>

<3b>

HEAD MOUNTED DISPLAY DEVICE AND IMAGE DISPLAY CONTROL METHOD THEREFOR

PRIORITY

This application claims the benefit under 35 U.S.C. §119 (a) of a Korean patent application filed on May 19, 2011 in the Korean Intellectual Property Office and assigned Serial No. 10-2011-0047203, the entire disclosure of which is hereby incorporated by reference.

BACKGROUND OF THE INVENTION

1. Field of the Invention

The present invention relates to an image display device and method. More particularly, the present invention relates to a head mounted display device and image display control method for the same.

2. Description of the Related Art

A Head-Mounted Display (HMD) device is a display device that is wearable in front of eyes like eyeglasses to display video signals input through a wired or wireless interface on an internal display unit. HMD devices may provide better realism in comparison to regular image display devices. However, existing HMD devices have to be enhanced in terms of cost, size and wearability. As many efforts are made to improve HMD devices, HMD devices are expected to become substitutes for television sets and monitors in the future.

Currently, commonly used HMD devices are monocular devices, which may be unsuitable for humans having two eyes to view things. Monocular HMD devices having a narrow field of view may cause user discomfort and feel unnatural. That is, it is difficult to deliver all wavelengths from points constituting an image to the eyes without distortion using a single optical channel.

SUMMARY OF THE INVENTION

Aspects of the present invention are to address at least the above-mentioned problems and/or disadvantages and to provide at least the advantages described below. Accordingly, an aspect of the present invention is to provide a binocular head mounted display device and an image display control method for the same that enable display of images optimized for user eyes.

In accordance with an aspect of the present invention, a Head Mounted Display (HMD) device is provided. The device includes a display unit including a left display and a right display for a left eye and a right eye for displaying images for the left eye and the right eye, a vital reaction sensor unit including a first vital reaction sensor for the left eye and a second vital reaction sensor for the right eye, for detecting vital reaction changes of a user viewing the left and right displays, and for generating, when a vital reaction change is detected, an interruption signal including coordinates of a position at which the vital reaction change is detected, and a control unit for outputting images for the left eye and the right eye to the display unit, and for adjusting, upon generation of the interruption signal, positions of the images according to the received coordinates and a given offset.

In accordance with another aspect of the present invention, an image display method for a head mounted display device is provided. The method includes segmenting an image to be displayed into a first image and a second image, and displaying the first image and the second image respectively on a left display and a right display for a left eye and a right eye, detecting vital reaction changes of a user viewing the left display and the right display through vital reaction sensors assigned respectively to the left eye and the right eye, generating, when a vital reaction change is detected, an interruption signal including coordinates of a position at which the vital reaction change is detected, adjusting, upon generation of the interruption signal, positions of the images according to the received coordinates and a given offset, and displaying the adjusted images respectively on the left display and the right display, and adjusting the distance between the left display and the right display so that the distance between optical axes thereof is equal to the interpupillary distance of a user on a basis of the coordinates and the given offset.

In accordance with another aspect of the present invention, a user input method for a head mounted display device is provided The method includes segmenting an image having one or more selection items into a first image and a second image, and displaying the first image and the second image respectively on a left display and a right display for a left eye and a right eye, adjusting positions of the first image and the second image by a given offset according to the interpupillary distance of a user; detecting vital reaction changes of the user viewing the left display and the right display through vital reaction sensors assigned respectively to the left eye and the right eye, generating, when a vital reaction change is detected, an interruption signal including coordinates of positions of the left eye and the right eye at which the vital reaction change is detected, constructing an extended coordinate plane according to the image positions already adjusted by the offset so that coordinates of the left eye and the right eye positions are included in the extended coordinate plane, combining the coordinates of the left eye and the right eye positions into coordinates of a single position on the extended coordinate plane on the basis of the offset, and identifying positions, on the adjusted images and on the extended coordinate plane, corresponding to the portion at which a user selection input is generated.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
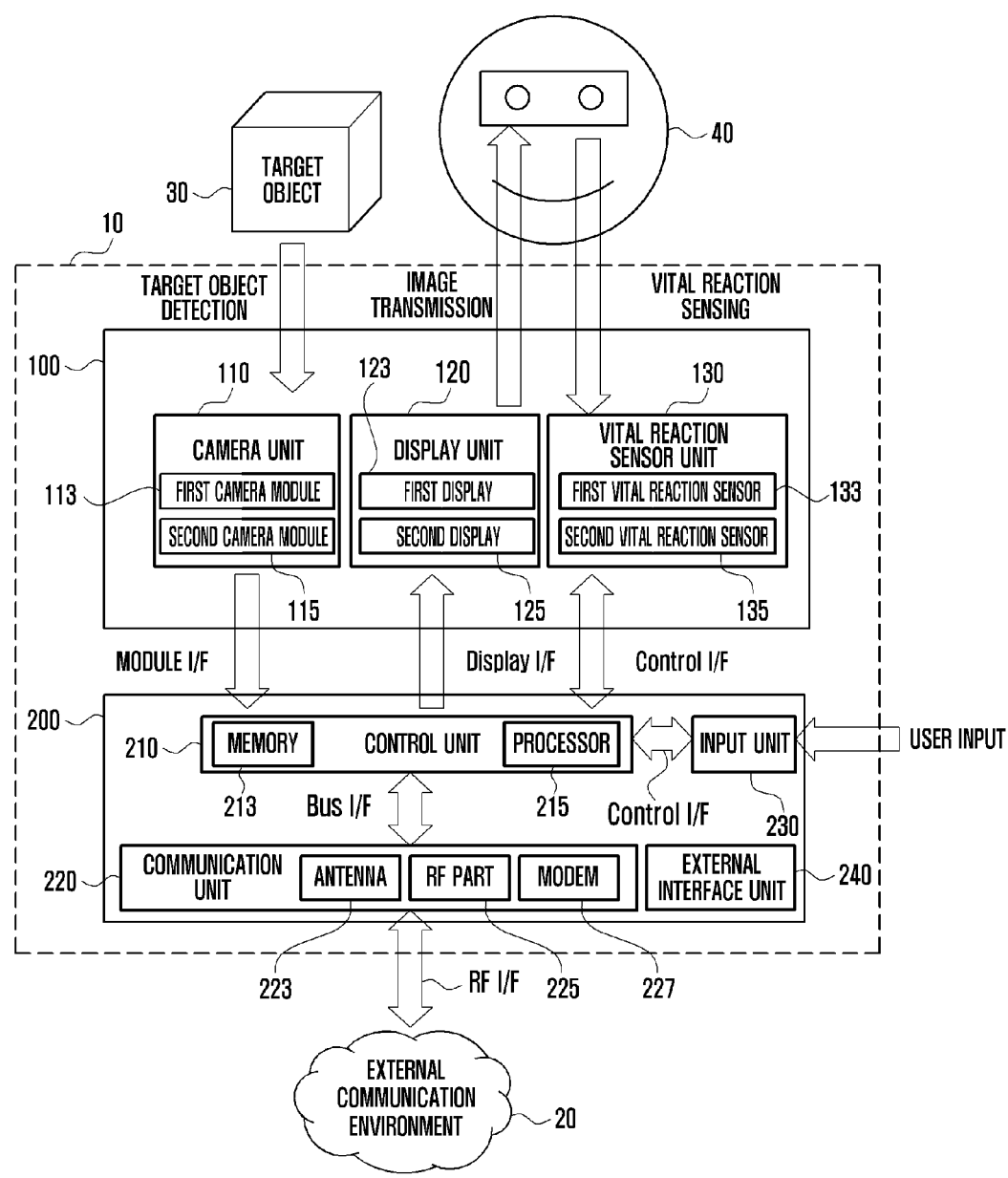
FIG. 1 is a block diagram of a Head Mounted Display (HMD) device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 9, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

A Head Mounted Display (HMD) device is a device worn on the head in front of a user's eyes to display video content, and may have various additional functions with the convergence trend. For example, an HMD device equipped with a camera module enables a user to view external objects. The HMD device may be further equipped with a user interface unit like a touch pad. The HMD device may also communicate with a nearby terminal through a wired or wireless connection. The HMD device may act as an information technology appliance. An exemplary HMD device may form a network with a nearby communication device, store and process information received through the network, and send processed or generated information through the network. An exemplary HMD scheme of the present invention may be applied to any device having a visualization capability, such as an HMD device, multimedia appliance, camera, camcorder, or telescope.

An exemplary HMD device of the present invention is a result of combination of various functions including an HMD function, input function and communication function. Through modularization, the HMD device may be realized as an independent technology intensive information and media appliance. The HMD device may become a substitute for various information technology devices having similar functions, and may have a potential to be a next generation information technology device through device-user interactions. The HMD device may be equipped with a recognition part for external objects, a visualization part for given content, a user input part, a communication part for networking with a nearby device, and a computation processor for processing information. Hence, the HMD device may provide differentiated user experience through seamless integration between functions and logging software. The HMD device may provide an infotainment (information+entertainment) feature as a wireless smart terminal. Hence, the HMD device may be applied to various fields including leisure and entertainment as an information technology appliance like a mobile terminal, smartphone, Portable Media Player (PMP), navigation aid, or digital camera. In addition, as the HMD device is portable while being worn on the head in front of the eyes, it may be applied to next generation military applications based on outdoor environments and a tactical information and communication system, such as sights of fire control systems in infantry battle equipment, battle vehicles, combat aircrafts and battle ships. The HMD device may also be applied to medical applications, such as optical aids, endoscopes and specialized surgical equipments. The HMD device has a potential to be a next generation appliance replacing a 2D or 3D television set or a movie theater.

An exemplary HMD device of the present invention is a binocular HMD device having dual optical channels capable of supporting the above functions.

FIG. 1 is a block diagram of an HMD device according to an exemplary embodiment of the present invention.

Referring to FIG. 1, an HMD device 10 may include an HMD processor 100 and a signal processor 200. The HMD processor 100 may include a camera unit 110 for capturing external images, a display unit 120 for displaying images from the signal processor 200, and a vital reaction sensor unit 130 for sensing reactions of a user 40. The signal processor 200 may include a control unit 210 for controlling overall operation of the HMD device 10 according to features of the exemplary embodiment of the present invention, a communication unit 220 for communicating with an external communication environment 20, an input unit 230 for receiving user commands, and an external interface unit 240 for connecting to an external device for data exchange.

The control unit 210 may include a memory 213 for storing programs and related data needed to control operation of the HMD device 10, and a processor 215 for controlling operation of the HMD device 10. The communication unit 220 connects to the external communication environment 20 to perform communication for the HMD device 10. Here, the external communication environment 20 may be a wireless communication network or an IP network. For wireless communication, the communication unit 220 may include an antenna 223 for wireless communication with the external communication environment 20, a Radio Frequency (RF) part 225 connected with the antenna 223 for upconverting a baseband transmit signal into a radio frequency signal and amplifying the radio frequency signal and for low-noise amplifying a received radio frequency signal and downconverting the received radio frequency signal into a baseband signal, and a modem 227 placed between the RF part 225 and the control unit 210 for modulating a signal to be transmitted and demodulating a received signal. For wireless Internet communication such as WiFi, the communication unit 220 may include an antenna 223, an RF part 225, and a modem 227. For wired Internet communication, the communication unit 220 may include a modem 227. The input unit 230 is used to receive user commands, and may include a keypad and/or a touchpad. The external interface unit 240 is used for short-range wired or wireless communication. The external interface unit 240 may be a USB interface in the case of wired communication; and the external interface unit 240 may be an interface for Near Field Communication (NFC), Bluetooth or Ultra WideBand (UWB) in the case of wireless communication.

The camera unit 110 captures an image of a target object 30, converts the image into digital data, and sends the digital data to the control unit 210. The camera unit 110 may include two camera modules that may include a first camera module 113 and a second camera module 115 corresponding to the left and right eyes, which may act as focuses for the left and right eyes under control of the control unit 210. The display unit 120 displays image data under control of the control unit 210. The display unit 120 may include two display parts that may include a first display 123 and a second display 125 corresponding to the left and right eyes of the user 40, which may display images to be viewed respectively by the left and right eyes under control of the control unit 210. The vital reaction sensor unit 130 senses reactions of the user 40. In particular, the vital reaction sensor unit 130 may include a first vital reaction sensor 133 and a second vital reaction sensor 135, which may sense reactions of the left and right eyes. As described above, the HMD processor 100 may function as a binocular display device. The display unit 120 may include left and right displays. The camera unit 110 may include two camera modules corresponding to the left and right eyes to thereby provide two optical channels. The display interface may include a left display interface and a right display interface to selectively activate the two display parts of the display unit 120. The vital reaction sensor unit 130, which adjusts the interpupillary distance of the display unit 120 and feeds back adjustments, may further include an optical feedback part that includes optical adjustment and feedback circuits to adjust reaction selection regions of the left and right eyes. The optical feedback part is described later in connection with FIG. 8.

The camera unit 110 captures an image through a lens. The camera unit 110 includes a camera sensor (not shown) for converting a captured optical signal to an electrical signal and a signal processor (not shown) for converting an analog video signal received from the camera sensor to digital data. The camera sensor may be a Charge Coupled Device (CCD) sensor or a Complementary Metal-Oxide Semiconductor (CMOS) sensor, and the signal processor may be a Digital Signal Processor (DSP), to which the present invention is not limited.

As to operation of the HMD device 10 having the above configuration, the camera unit 110 captures an image of the target object 30 and sends the captured image to the control unit 210 through a module interface. Here, a video signal from the camera unit 110 may include video data and H-sync and V-sync timing data in various formats including YUV. The control unit 210 may compress and store images from the camera unit 110, decompress stored compressed images or perform scaling and color conversion of images from the camera unit 110, and send the processed images to the display unit 120 through the display interface. Here, images sent by the control unit 210 to the display unit 120 may be in various formats including RGB, and may be encoded and decoded before and after transmission. The display unit 120 may present images from the control unit 210 to the eyes of the user 40 through an optical instrument.

The user 40 may view displayed images. The vital reaction sensor unit 130 may sense reactions of the user 40 viewing images and send an interruption signal corresponding to the sensed reactions to the control unit 210 through a control interface. Here, the control interface may be realized in various schemes including Inter-Integrated Circuit (I2C). Vital reactions of the user 40 may be sensed through eye-tracking, detection of dilation and contraction of the pupil, tracking of pupil location, measurement of changes in muscles around the eyeball, and/or measurement of refraction of the cornea. Such vital reactions may be detected by various sensors such as an acceleration sensor and a gravity sensor. The vital reaction sensor unit 130 may include software and hardware elements that rigorously classify user reactions as input and notify the control unit 210 of generation of an input with a preset resolution. The control unit 210 may also include software and hardware elements that accept and process such an input. The control unit 210 processes user input using internal software and hardware elements and controls the display unit 120 to display reconstructed image data according to the processing results. In addition to an input through vital reaction sensing, control of image display and image reconstruction may be initiated by a user control command input through the input unit 230. That is, control of image display and image reconstruction may be triggered by vital reaction sensing and/or user input. When the signal processor 200 includes a separate display part, visualization may also be performed through the display part of the signal processor 200.

The display unit 120 may display images, which have been captured by the camera unit 110, from the control unit 210, and the vital reaction sensor unit 130 may sense reactions of the user 40 viewing the displayed images and notify the control unit 210 of the user reactions using a corresponding interruption signal. Likewise, control of image display and image reconstruction may be triggered by vital reaction sensing and/or user input through the input unit 230, and visualization may also be performed through a display part of the signal processor 200.

The communication unit 220 may communicate with the external communication environment 20 through an RF interface. Here, the RF interface may be one of various communication schemes, such as third generation communication, Global System for Mobile Communications (GSM), Wideband Code Division Multiple Access (WCDMA), Long Term Evolution (LTE), wireless Internet (WiBro), and any next-generation scheme. The HMD processor 100 may act as a display part and input part for the signal processor 200, and may report display status to the signal processor 200 and control image display through the vital reaction sensor unit 130. Image display and image reconstruction may be triggered and controlled through the vital reaction sensor unit 130 and/or the input unit 230. The HMD processor 100 and the signal processor 200 may be integrated into a single entity, which may not only be worn for viewing like glasses but also act as a mobile terminal for communication with an external device (not shown).

The communication unit 220 may include an RF transmitter (not shown) for up-converting the frequency of transmitted signals and amplifying the transmitted signals, and an RF receiver (not shown) for low-noise amplifying of received RF signals and down-converting the frequency of the received RF signals For external communication through the RF interface, the integrated entity or the signal processor 200 may support various communication protocols, and may actively or passively communicate with a communication device supporting the same protocol through a contact/non-contact communication infrastructure. Here, non-contact communication indicates wired/wireless communication between devices. The signal processor 200 may form a network with an external device supporting the same protocol to send and receive data to and from the external device. Images captured by the camera unit 110 and data from the external device may be displayed as visual objects by the HMD processor 100 or the integrated entity. The vital reaction sensor unit 130 may sense a user command or gesture on the visual objects through user reaction sensing and send the sensed command to the control unit 210. Upon reception of the sensed user reaction, the control unit 210 may perform a corresponding operation through hardware and software means to thereby execute a function requested by the user 40. The control unit 210 may present operation results and reconfigured objects to the user 40 through the display interface or forward the same to the external device through the communication unit 220.

Figure 2:
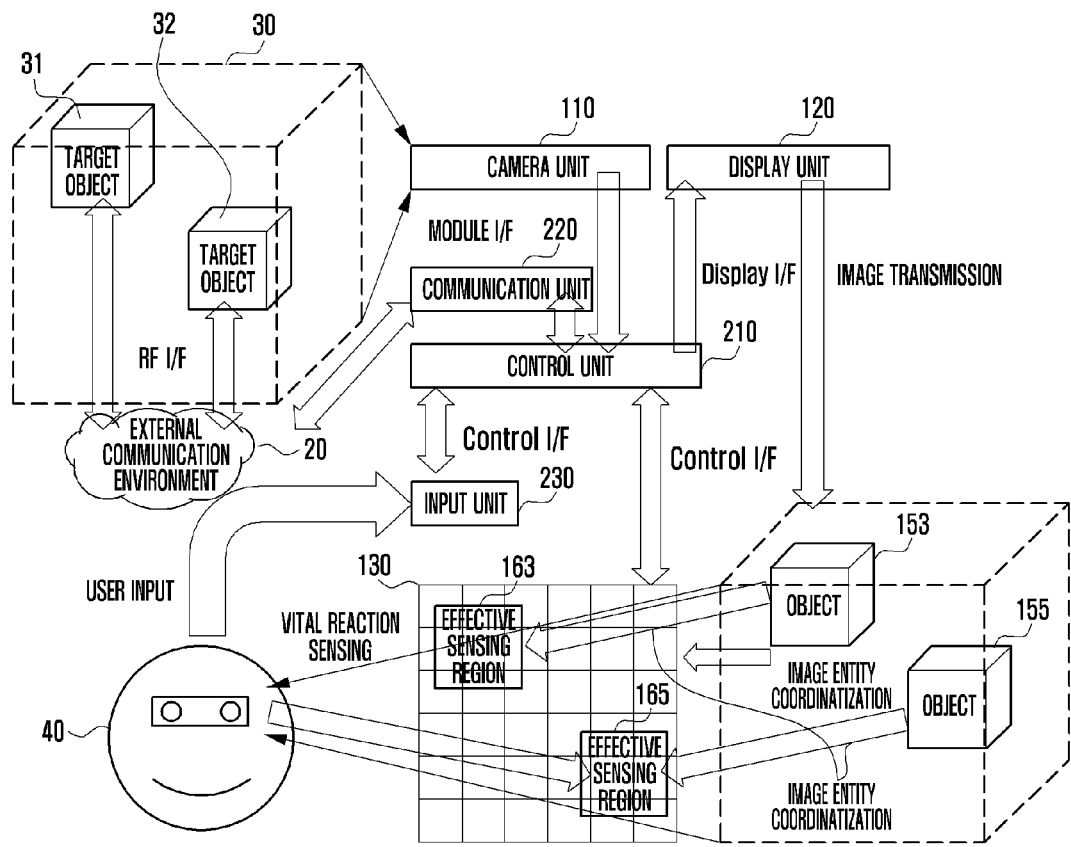
FIG. 2 depicts an operation of an HMD device according to an exemplary embodiment of the present invention.

FIG. 2 depicts an operation of an HMD device according to an exemplary embodiment of the present invention.

Referring to FIG. 2, preset attributes of target objects 31 and 32 may be input to the communication unit 220 through a communication protocol based on an RF interface defined by the external communication environment 20. That is, the HMD device 10 may exchange well-defined object attributes with an external device through the communication unit 220. In addition, the camera unit 110 may capture images of the target objects 31 and 32 and send the captured images to the control unit 210. The user 40 may view the captured images through the display unit 120, and the attributes of the target objects 31 and 32 received by the communication unit 220 may be reconfigured and recombined in a well-defined manner by the control unit 210 and be assigned to objects 153 and 155. Although the user 40 may view only images of the objects 153 and 155, the integrated entity of the HMD processor 100 and the signal processor 200 shown in FIG. 1 may define various attributes on the basis of the objects 153 and 155. Image regions of visualized objects may be represented in coordinates by the vital reaction sensor unit 130, and coordinates of effective sensing regions 163 and 165 may be defined through vital reaction sensing. Coordinates of image regions determined by the vital reaction sensor unit 130 may be used in various ways according to means for vital reaction sensing. For example, the vital reaction sensor unit 130 may represent an image region in coordinates by subdividing the image region, and may regard coincidence between an effective sensing region and pupil location as an interruption signal. The vital reaction sensor unit 130 may sense vital reactions in various ways including measurement of changes in muscles around the eyeball in addition to tracking of pupil location.

As described above, the vital reaction sensor unit 130 uses defined attributes of the objects 153 and 155 and may generate an input interruption signal at the effective sensing regions 163 and 165 through vital reaction sensing.

Here, vital reaction sensing may be achieved through one of selecting effective sensing regions 163 and 165 from portions represented in coordinates by the vital reaction sensor unit 130, selecting one or more of effective sensing regions (including the effective sensing regions 163 and 165 or more) according to determination of the user 40, and generating an interruption signal by the vital reaction sensor unit 130 to notify the control unit 210 of selecting effective sensing regions 163 and 165 or more according to determination of the user 40.

The vital reaction sensor unit 130 may sense vital reactions of a user 40 by means of eye tracking, cornea refraction measurement, gravity sensing or the like. That is, the vital reaction sensor unit 130 detects motion of the eye of the user 40, and vital reactions may correspond to changes in eye movement, for example, a change in the line of vision of the user 40. The vital reaction sensor unit 130 represents vital reaction changes of the user 40 in coordinates within hardware and software performance limits, determines magnitude ranges of the vital reaction changes fitting to a visualization area of the HMD processor 100, and assigns coordinates and regions to effective sensing regions 163 and 165 corresponding to visualized regions of the objects 153 and 155. Thereafter, when the user 40 attempts to select one or more of the effective sensing regions 163 and 165, the vital reaction sensor unit 130 detects user reaction changes by means of eye tracking, cornea refraction measurement, gravity sensing or the like and processes the detected reaction changes through numerical representation thereof. When the user 40 determines a part to be selected, user behavior (for example, the line of vision) may be fixed at the corresponding location. Hence, at the time of determination, no change in the line of vision of the user 40 may be detected through eye tracking, cornea refraction measurement or gravity sensing. When no vital reaction change (for example, no change in the line of vision) is detected for a preset time, the vital reaction sensor unit 130 may regard this as an input interruption and send coordinates of the location where no vital reaction change is detected to the control unit 210. Hence, the control unit 210 may be aware of coordinates of the location where the input interruption has occurred.

In response to a specified interruption, the control unit 210 may reconfigure or recreate images, reconfigure or recombine attributes of the objects 153 and 155 through hardware and software operations according to intention of the user 40, or output information on the processed attributes to the communication unit 220 to update attributes on the network. Details of the above process may be delivered to the display unit 120 through the display interface and visualized to the user 40. The user 40 may generate an interruption signal through the input unit 230. Such user input may be used independently or in combination with the process described above. In the event that the signal processor 200 includes a separate display part, the signal processor 200 may also visualize the above process.

Figure 3:
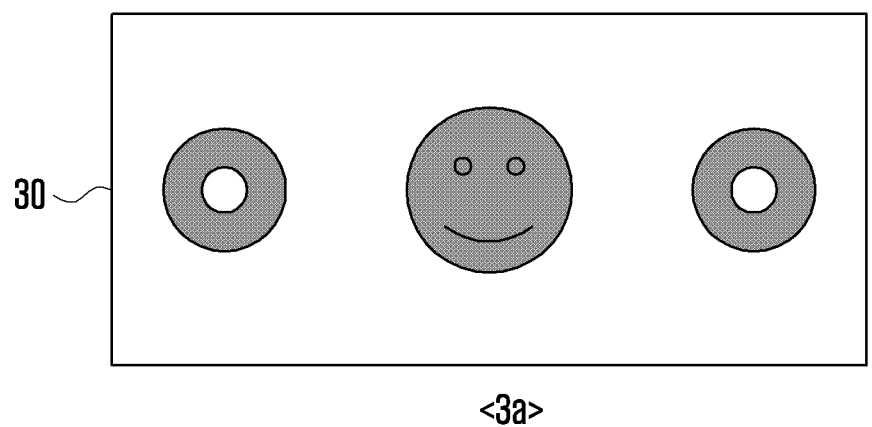
FIG. 3 illustrates a displayed field of view produced by a monocular HMD device according to an exemplary embodiment of the present invention.
Figure 3:
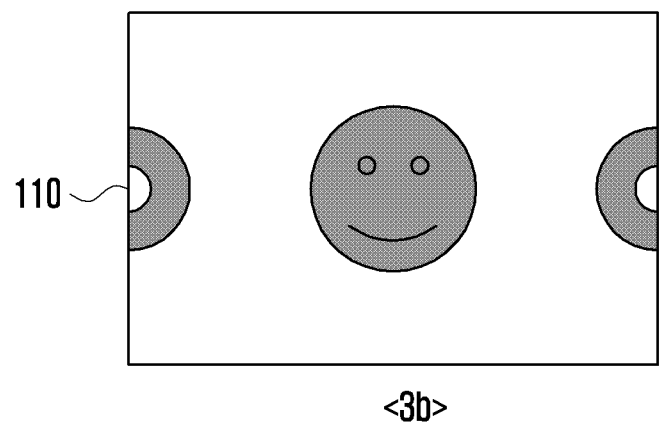

FIG. 3 illustrates a displayed field of view produced by a monocular HMD device according to an exemplary embodiment of the present invention.

Referring to FIG. 3, when a camera unit 110 of a monocular type having a single optical channel is used for a target object 30 indicated by <3a>, an image of the target object 30 may be formed on the image sensor of the camera unit 110 as indicated by <3b>. Hence, the image captured by the camera unit 110 of a monocular type is in a reduced form with left and right edge portions cut off as indicated by <3b>. It is possible to obtain an extended image indicated by <3a> by applying a binocular display scheme with dual optical channels to an image indicated by <3b>.

Figure 4:
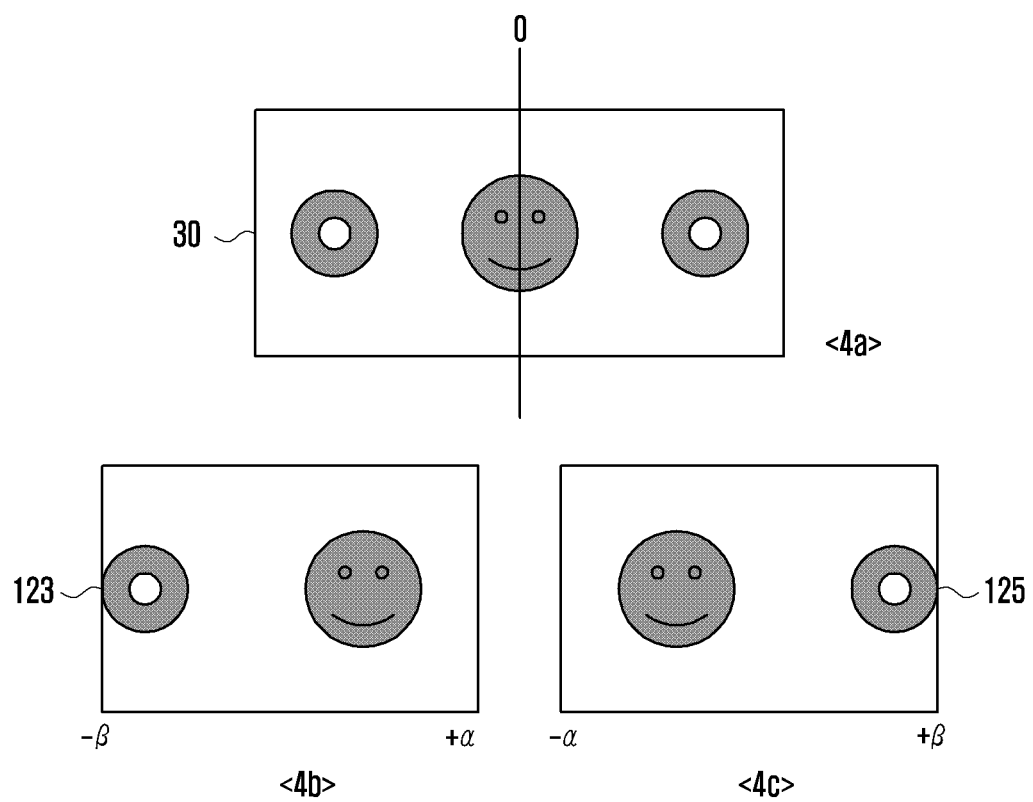
FIG. 4 illustrates a formation of display regions in a binocular HMD device having dual optical channels according to an exemplary embodiment of the present invention.

In one exemplary embodiment of the present invention, an HMD device is provided that includes an HMD processor 100 having binocular displays and camera image sensors, and a signal processor 200. The HMD device having dual optical channels for binocular display may produce image regions as shown in FIG. 4. In the exemplary embodiment of the present invention, image display is performed not using a real image system based on OLED, CRT or LCD display but using a virtual image system in which wavelengths of every point in an image are delivered to the eye.

FIG. 4 illustrates a formation of display regions in a binocular HMD device having dual optical channels according to an exemplary embodiment of the present invention.

Referring to FIG. 4, an HMD processor 100 delivers different images to the eyes, so that the images may be combined into a wider image through a biological visual perception process. That is, the image of a target object 30 indicated by <4a> may be an image captured by the camera unit 110 or be a virtual image provided by the control unit 210 of the signal processor 200.

Assume that the image indicated by <4a> is an image of a target object 30 captured by the camera unit 110. Images of the target object 30 captured by the first camera module 113 and the second camera module 115 of the camera unit 110 may be displayed on the first display 123 and the second display 125 of the display unit 120 as indicated by <4b> and <4c>. That is, images of the target object 30 indicated by <4a> may be delivered to the left eye 41 and the right eye 42 of the user 40 by means of the camera unit 110 and the display unit 120. Here, according to arrangement of optical elements such as a polarizer and lens in the HMD processor 100, the first camera module 113 or the second camera module 115 may be assigned to the left eye 41 (or to the right eye 42); and the first display 123 or the second display 125 may be assigned to the left eye 41 (or to the right eye 42). The images captured by the first camera module 113 and the second camera module 115 are narrow images as indicated by <4b> and <4c> in comparison to the original image indicated by <4a>. The captured images are sent to the control unit 210, which processes the captured images and outputs the processed images to the first display 123 and the second display 125 as indicated by <4b> and <4c>. The user 40 may combine the images into a wider image as indicated by <4a> through a biological visual perception process, in contrast to the image produced by a monocular HMD device having a single optical channel as indicated by <3b>. That is, the binocular HMD device may provide a wider field of view. Referring to FIG. 4, in the binocular HMD device, with a left/right overlap of [+α, −α] by the origin point 0, an image of a field of view [−β, +α] indicated by <4b> and an image of a field of view [−α, +β] indicated by <4c> are combined into a wider image indicated by <4a>, thereby providing a field of view [−β, +β] to the user 40.

Next, a description is given of exemplary operations of a binocular HMD device.

Figure 5:
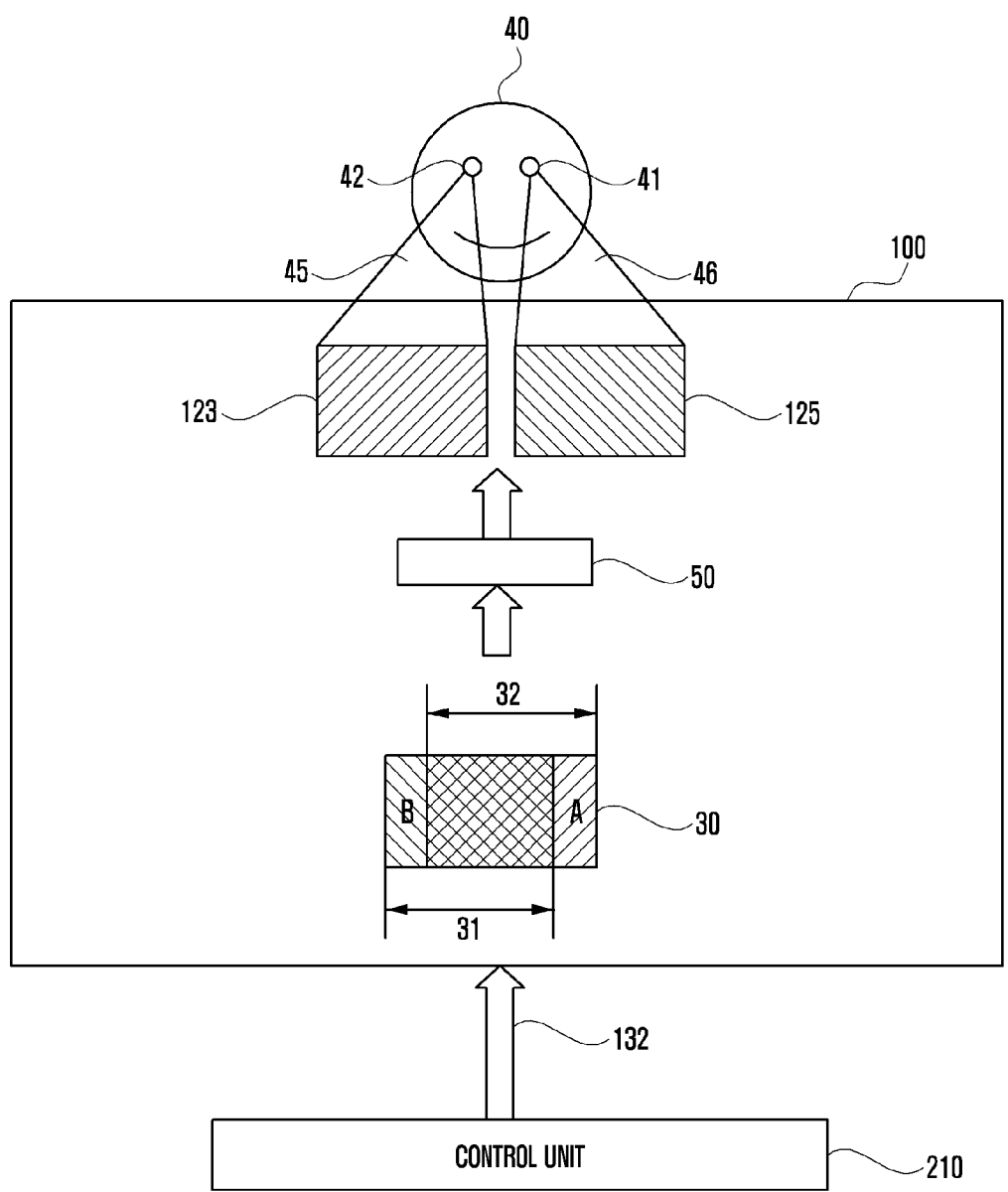
FIG. 5 illustrates a first approach to generation of partial images for binocular display in an HMD processor of an HMD device according to an exemplary embodiment of the present invention.

FIG. 5 illustrates a first approach to generation of partial images for binocular display in an HMD processor according to an exemplary embodiment of the present invention. An image of a target object 30 captured by the camera unit 110, and the first display 123 and the second display 125 for presenting images to the eyes of the user 40 are illustrated in the HMD processor 100 of FIG. 5.

Referring to FIG. 5, an image captured by the camera unit 110 is sent to the control unit 210, and the control unit 210 processes the captured image and sends the processed image 132 to the HMD processor 100. Here, the original image 30 of a target object is processed so that it may be viewed by the left eye 41 and the right eye 42. In an exemplary embodiment, the HMD processor 100 uses an optical member 50 containing a polarizer and lens to convert the original target object image 30 into a partial image A 32 and partial image B 31 through polarization, and sends the partial image A 32 and partial image B 31 respectively to the first display 123 and the second display 125. Alternatively, the partial image A 32 and partial image B 31 may be sent respectively to the second display 125 and the first display 123. Such association between partial images 31 and 32 and the first and second displays 123 and 125 may be determined by polarization schemes of the optical member 50. The partial images 31 and 32 on the first and second displays 123 and 125 are sent respectively to the right field of view 45 and left field of view 46 and are projected onto the retinas of the left eye 41 and the right eye 42 of the user 40. Thereby, the user 40 may recognize the partial image A 32 and partial image B 31 as the original image 30.

In another exemplary embodiment, the partial image A 32 and partial image B 31 may be polarized based on particular spectra. For example, the optical member may be configured so as to deliver a partial image A 32 of a red-wavelength spectrum to one display and deliver a partial image B 31 of a green-wavelength spectrum to the other display for full color reproduction.

In addition to images captured by the camera unit 110, a still or moving image stored in the control unit 210 may also be converted into an original image 30, partial image A 32 and partial image B 31. When such an optical member is not used in the HMD processor 100, the control unit 210 may generate partial images and send the partial images to the display unit 120.

Figure 6:
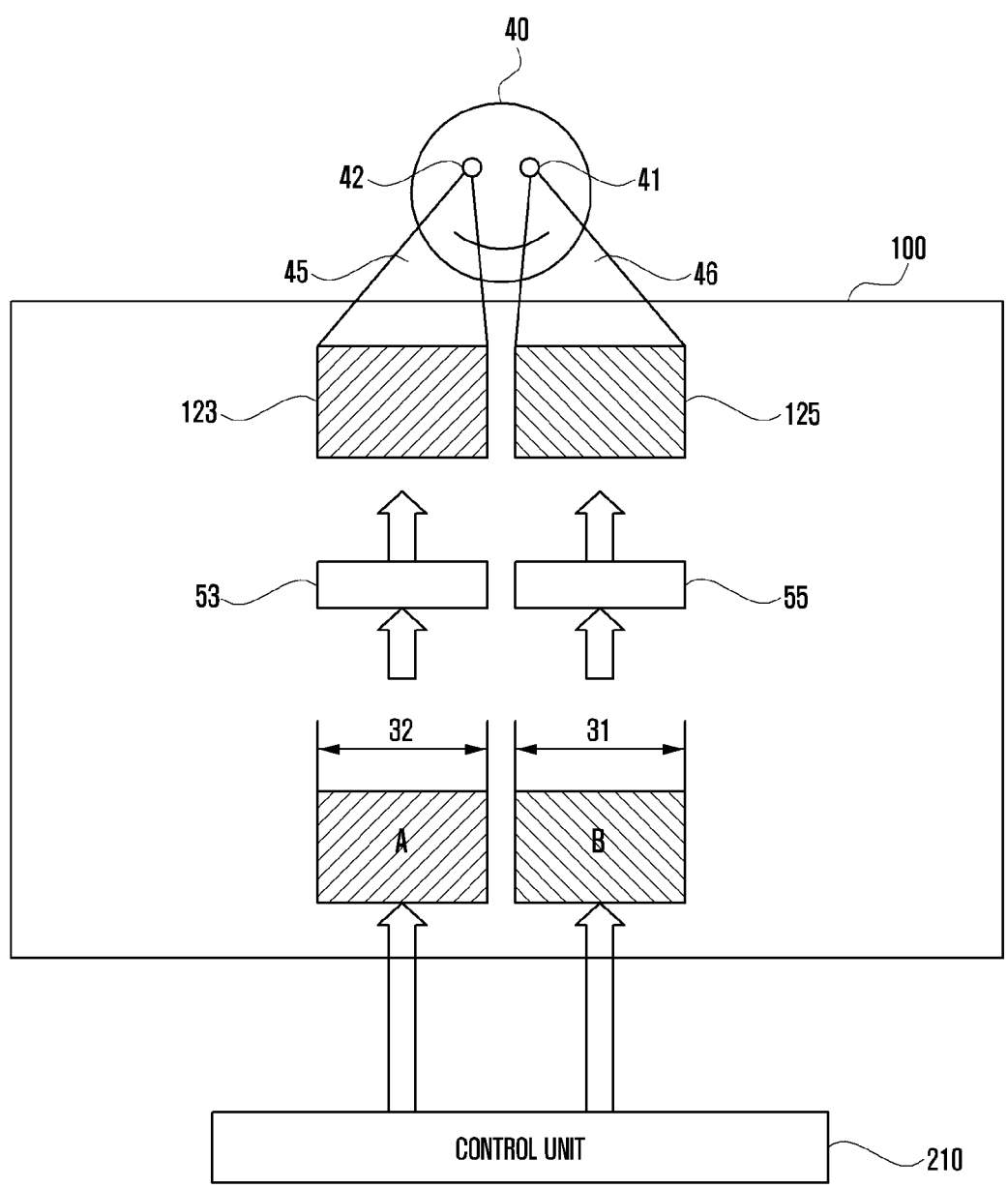
FIG. 6 illustrates a second approach to generation of partial images for binocular display in an HMD processor according to an exemplary embodiment of the present invention.

FIG. 6 illustrates a second approach to generation of partial images for binocular display in a signal processor according to an exemplary embodiment of the present invention.

Referring to FIG. 6, the control unit 210 may obtain an original image 30 of a target object through the first camera module 113 and the second camera module 115. In FIG. 6, a partial image A 32 and partial image B 31 may be captured respectively by the first camera module 113 and the second camera module 115, or be constructed by the control unit 210 through internal image processing on the basis of an original image 30 captured by the camera unit 110 with a single camera module. The control unit 210 sends the partial image A 32 and partial image B 31 respectively to the first display 123 and the second display 125 through the display interface. In FIG. 6, unlike the case of FIG. 5 in which two partial images are obtained from an original image 30 through optical transform performed by the optical member 50 in the HMD processor 100, the control unit 210 directly creates two partial images and sends the partial images respectively to the first display 123 and the second display 125 so as to construct an original image 30.

In the first approach of FIG. 5, the control unit 210 does not have to internally perform image segmentation and synchronization, and the optical member 50 performs optical transform (analog approach). In the second approach of FIG. 6, the control unit 210 creates two partial images through internal image processing and sends the partial images in synchronization using different hardware interfaces (digital approach). Hence, in the second approach of FIG. 6, optical members 53 and 55 may have a simpler hardware configuration because they only have to perform optical transform for delivering virtual images respectively to the first display 123 and the second display 125. After passing through the optical members 53 and 55, the partial image A 32 and partial image B 31 are sent respectively to the right field of view 45 and the left field of view 46 of the user 40.

Similarly to the first approach of FIG. 5, the control unit 210 may create a partial image A 32 and partial image B 31 having spectra for specific colors. For example, the control unit 210 may create a partial image A 32 of a red-wavelength spectrum and a partial image B 31 of a green-wavelength spectrum, and deliver the partial image A 32 and partial image B 31 respectively to the right field of view 45 and the left field of view 46. Then, the user 40 may recognize the images as an original image 30 through biological perception.

As described above, both the first approach of FIG. 5 and the second approach of FIG. 6 may provide an original image 30 with a wider field of view. In addition, the vital reaction sensor unit 130 for sensing user reactions must recognize partial images. That is, to construct a complete image as to both eyes, as partial images presented respectively to the left eye 41 and the right eye 42 are different, coordinates recognized by the vital reaction sensor unit 130 are not the same for the left eye 41 and the right eye 42. Hence, vital reaction sensing for a binocular field of view is not identical to that for a monocular field of view.

Figure 7:
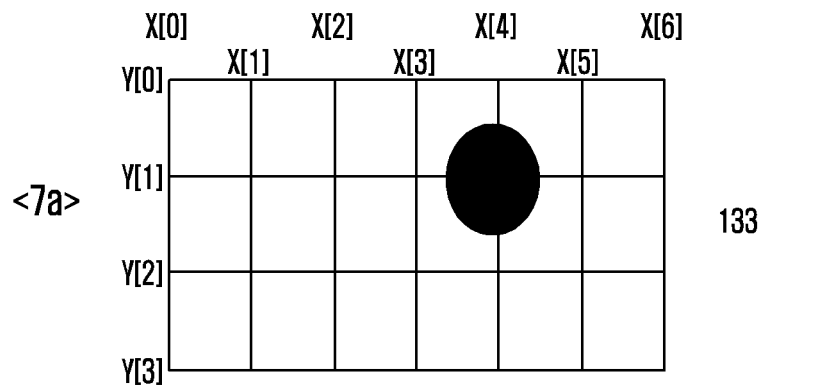
FIG. 7 illustrates a vital reaction sensing of an HMD processor to provide a binocular field of view according to an exemplary embodiment of the present invention.
Figure 7:
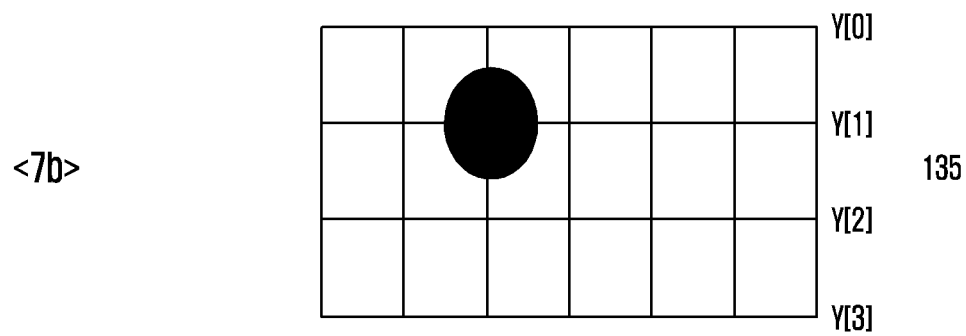
Figure 7:
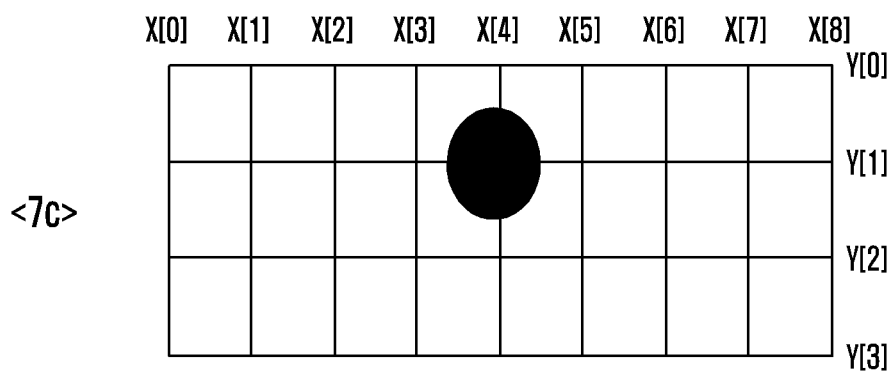

FIG. 7 illustrates a vital reaction sensing of an HMD processor to provide a binocular field of view according to an exemplary embodiment of the present invention.

Referring to FIG. 7, for vital reaction sensing, the vital reaction sensor unit 130 and the control unit 210 have to share information for sensing vital reaction changes of the user 40. Specifically, the vital reaction sensor unit 130 may include vital reaction sensors for the left eye 41 and the right eye 42 to detect vital reaction changes. For vital reaction change detection, the vital reaction sensor unit 130 extracts effective sensing regions for the left eye 41 and the right eye 42 from portions represented in coordinates, selects the effective sensing regions, and sends information on the selected effective sensing regions to the control unit 210. That is, the vital reaction sensor unit 130 determines sizes of sensing regions suitable for the left eye 41 and the right eye 42, assigns coordinates to each point in the sensing regions to identify coordinates of the effective sensing regions for the left eye 41 and the right eye 42, and shares this information with the control unit 210.

During image display, the vital reaction sensor unit 130 detects vital reaction changes of the left eye 41 and the right eye 42 using sensors, and sends numerical data indicating the detected vital reaction change to the control unit 210. When no vital reaction change of the left eye 41 and/or the right eye 42 is detected for a preset time (namely, the line of vision is fixed), the vital reaction sensor unit 130 sends the coordinates indicated by the line of vision (the left eye 41 and/or the right eye 42) and an interruption signal to the control unit 210. The control unit 210 reconstructs images by adjusting the location of the images according to the interruption signal and coordinate information. In addition, the control unit 210 represents coordinates indicated by the line of vision (the left eye 41 and/or the right eye 42) and interruption signals in numerical data to construct a unified coordinate plane, and reconstruct a user input region for user 40's determination.

As described above, the control unit 210 may represent sensing results of the vital reaction sensor unit 130 in coordinates as indicated by <7c>. Hence, the control unit 210 may identify a selected portion among the icon (location indicated by the line of vision of the user 40) and the display region and execute a corresponding program. When the HMD processor 100 is configured as a monocular entity, the vital reaction sensor unit 130 for detecting user selection is composed of a single sensor. In this case, it is difficult to map the output of the vital reaction sensor unit 130 to a programmed coordinate plane in the control unit 210 as indicated by <7c>. For a binocular field of view, the first display 123 and the second display 125 may be matched respectively with a first vital reaction sensor 133 and a second vital reaction sensor 135. In this case, output results of the first vital reaction sensor 133 and the second vital reaction sensor 135 delivered to the control unit 210 for coordinate identification are different. Hence, the control unit 210 has to perform a procedure for determining a position on the programmed coordinate plane to which the selected portion is mapped.

Referring to FIG. 7, assume that sensing regions having coordinate ranges of Y[0:4] and X[0:6] are assigned respectively to the first vital reaction sensor 133 located in one field of view of the user 40 and the second vital reaction sensor 135 located in the other field of view. Here, as the location of the visual icon to be delivered to the control unit 210, the first vital reaction sensor 133 may output coordinates (X=4, Y=1) as indicated by <7a> and the second vital reaction sensor 135 may produce coordinates (X=2, Y=1) as indicated by <7b>. If the control unit 210 processes these coordinates in a manner required for monocular head mounted display, it may be unable to determine whether the visual icon is selected because the locations identified by the left eye 41 and the right eye 42 are different. In this case, as coordinates for the left eye 41 and the right eye 42 are different, it is difficult to utilize individual coordinates as user input means. Hence, it is necessary to devise a new means. In an exemplary embodiment of the present invention, an offset 'a' depending upon the interpupillary distance is defined as follows. The distance between the first display 123 and the second display 125 is adjusted, so that the distance between the optical axes of the first display 123 and second display 125 is equal to the interpupillary distance of the user 40, and the partial image A 32 and partial image B 31 on the first display 123 and second display 125 are fused into a complete image. To achieve this, the HMD device 10 may include a visual index input means that enables the user 40 to enter a visual index change command. The input unit 230 may act as a visual index input means, or a separate visual index input means may be included in the HMD processor 100. The user 40 may adjust the distance between the first display 123 and the second display 125 using the visual index input means. Here, a feedback value from this adjustment may be used to determine the offset 'a'.

The HMD processor 100 may utilize the offset 'a' to adjust the positions of the first display 123 and the second display 125 so that the first display 123 and the second display 125 are well matched to the eyes of the user 40, and to fine-tune the central focus for a wider field of view. Here, when an offset 'a' is received, the first vital reaction sensor 133 and/or the second vital reaction sensor 135 may add the offset 'a' to x-axis or y-axis values of the corresponding sensing region and notify this adjustment to the control unit 210. Alternatively, the first vital reaction sensor 133 and the second vital reaction sensor 135 may send coordinates of the selected visual icon (for example, (X=4, Y=1) for the first vital reaction sensor 133 as indicated by <7a> and (X=2, Y=1) for the second vital reaction sensor 135 as indicated by <7b>) to the control unit 210, and the control unit 210 may add the offset 'a' to the corresponding received coordinates. In these two schemes, the control unit 210 may adjust coordinates of the selected visual icon received from the first vital reaction sensor 133 and/or the second vital reaction sensor 135 by adding the offset 'a' to values on the corresponding number line. The coordinate plane indicated by <7c> may be constructed by forming the set union of axis values changed by the offset with respect to one of the first vital reaction sensor 133 and the second vital reaction sensor 135 and axis values not changed by the offset with respect to the other. Here, axis values (coordinate values) and the offset may be non-negative integers.

In FIG. 7, the offset for the first vital reaction sensor 133 is zero as indicated by <7a>, and the offset 'a' for the second vital reaction sensor 135 is 2 with respect to the x-axis as indicated by <7b>. In this case, the identified coordinates (X=2, Y=1) may be adjusted to coordinates (X=2+a, Y=1), which are provided to the control unit 210. In other words, as the offset 'a', a feedback value associated with interpupillary distance adjustment, is 2, the adjusted coordinates become (X=4, Y=1). Arithmetically averaging coordinates (X=4, Y=1) as to the first vital reaction sensor 133 and coordinates (X=4, Y=1) as to the first vital reaction sensor 133 results in coordinates (X=4, Y=1) ((4+4)/2, 1). Hence, when coordinates identified by the first vital reaction sensor 133 and the second vital reaction sensor 135 for both eyes are obtained through the above-described process, the identified coordinates are mapped by the control unit 210 on a unified coordinate plane extended by the offset 'a' (a feedback value associated with interpupillary distance adjustment). Hence, the control unit 210 may obtain transformed coordinates on the unified coordinate plane, identify the position at which a user input has occurred, and use the coordinates as a user input means.

To summarize, coordinates obtained by the first vital reaction sensor 133 are sent as (X=i, Y=j) to the control unit 210; coordinates obtained by the second vital reaction sensor 135 are sent as (X=i+a, Y=j) to the control unit 210; and the control unit 210 maps these coordinates to (X=(i+i+a)/2, Y=j) through arithmetic averaging. The control unit 210 sends the partial image A 32 and partial image B 31 respectively to the first display 123 and the second display 125, and visualizes the selection icon on the partial images at coordinates (X=i+a, Y=j). Later, when a result of vital reaction sensing is fed back by the vital reaction sensors 133 and 135, the control unit 210 maps (X=i+a, Y=j) to (X=(i+i+a)/2, Y=j) and checks whether the mapped coordinates are selected.

In FIG. 7, the x-coordinate range is extended from X[0:6] to X[0:8], and x-axis values belonging to a non-overlap range X[0:1] for the first vital reaction sensor 133 are used without change by the control unit 210 for checking coordinate selection. As the visual icon is not detected by the second vital reaction sensor 135, feedback coordinates are absent. For the second vital reaction sensor 135, a non-overlap range X[5:6] is translated to X[7:8] (X[5+2:6+2]) by the control unit 210 for checking coordinate selection. Although, in FIG. 7, the offset is added to the output of the second vital reaction sensor 135, the offset may also be added to the output of the first vital reaction sensor 133. Offset-based adjustment described above may be applied to both the first approach of FIG. 5 and the second approach of FIG. 6.

As described above, the binocular HMD device may represent user 40's vital reaction sensing in coordinates. User 40's vital reactions may also be sensed in a simple HMD device without a binocular capability. For example, even when the display unit 120 includes a single display in the HMD processor 100, the vital reaction sensors 133 and 135 may be used for both eyes. Even when the display unit 120 includes a single display, the two camera modules 113 and 115 may still be used to capture partial images, and the control unit 210 may fuse the partial images into an original image and send the original image to the display unit 120 including a single display.

A user input method for the HMD device of the exemplary embodiment of the present invention is described. An image having one or more selection items is segmented into a first image and a second image, and the first image and second image are displayed respectively on a left display and a right display for the left eye 41 and the right eye 42. The positions of the first image and the second image are adjusted using a given offset according to the interpupillary distance of the user 40, and vital reaction changes of the user 40 viewing the left display and right display are detected through vital reaction sensors assigned respectively to the left eye 41 and the right eye 42. When a vital reaction change is detected, an interruption signal containing coordinates of left and right eye positions at the time of detection is generated. In response to the interruption signal, an extended coordinate plane is constructed according to the image positions already adjusted by the offset so that coordinates of left and right eye positions are included in the extended coordinate plane, and the coordinates of left and right eye positions are combined into coordinates of a single position on the basis of the offset. Using the above method, the HMD device of the exemplary embodiment of the present invention may identify positions, on the adjusted images and on the extended coordinate plane, corresponding to the portion at which a user selection input is generated.

Here, to obtain coordinates of left and right eye positions, when no vital reaction change is detected for a preset time, the vital reaction sensors generate coordinates of positions indicated by the lines of vision of the left eye 41 and the right eye 42.

To construct an extended coordinate plane, the offset is added to values of a corresponding axis for a first vital reaction sensor 133, and the set union between axis values changed by the offset for the first vital reaction sensor 133 and axis values not changed by the offset for a second vital reaction sensor 135 is formed. Here, axis values (values on the number lines) and the offset may be non-negative integers.

To combine the coordinates of left and right eye positions, the offset is added to coordinates obtained by a first vital reaction sensor 133, and an arithmetic average between the adjusted coordinates of the first vital reaction sensor 133 and coordinates obtained by a second vital reaction sensor 135 is computed as coordinates of a single position on the extended coordinate plane.

Figure 8:
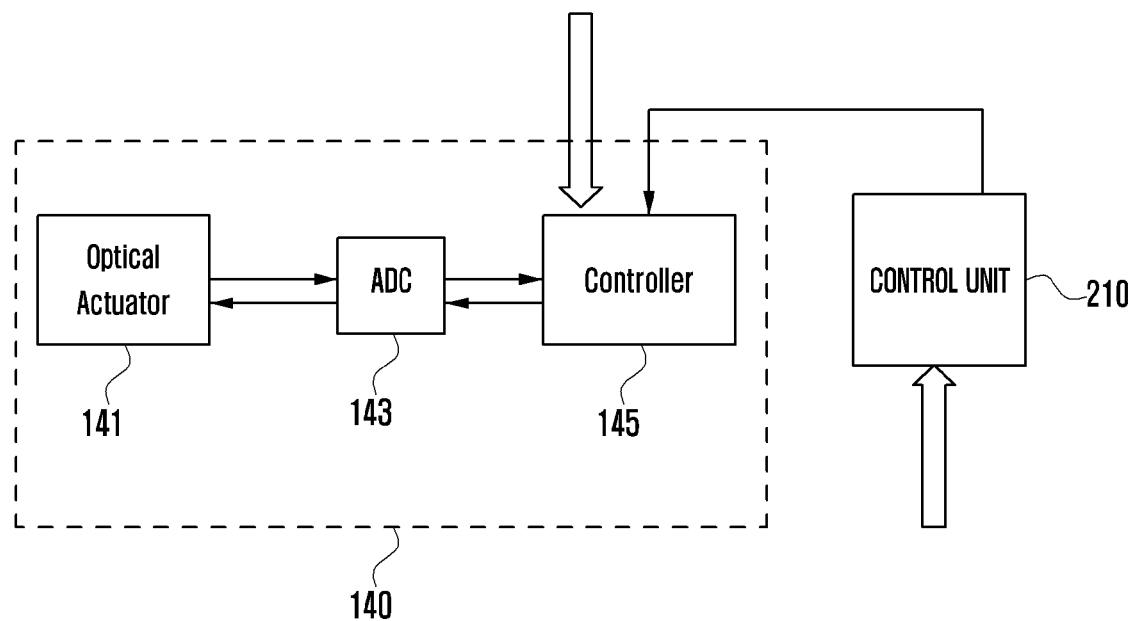
FIG. 8 illustrates a configuration of an optical feedback part to obtain an offset 'a' according to an exemplary embodiment of the present invention.

FIG. 8 illustrates a configuration of an optical feedback part to obtain the offset 'a' according to an exemplary embodiment of the present invention.

Referring to FIG. 8, an optical feedback part 140 may include an optical controller 145, an Analog-to-Digital Converter/Digital-to-Analog Converter (ADC/DAC) 143, and an optical actuator 141. The optical feedback part 140 may be included in the HMD processor 100. The optical controller 145, ADC/DAC 143 and optical actuator 141 in the optical feedback part 140 may be packaged as a single module or multiple modules. The user 40 may enter a focus adjustment command through a visual index input means. In response to the focus adjustment command, the HMD processor 100 may fine-tune the central focus by adjusting the optical axes of the first display 123 and the second display 125. The visual index input means may include a keypad, a touchpad and a sensor.

Here, the input unit 230 may act as a visual index input means, or a separate visual index input means may be installed in the HMD processor 100. When the input unit 230 is used as a visual index input means, a command entered by the user 40 is sent to the control unit 210, which may then forward the user command to the optical controller 145 through a control interface. Here, the control interface may be a serial input/output port including I2C. When a visual index input means is installed in the HMD processor 100, a user command may be directly input to the optical controller 145.

The optical controller 145 may receive an optical axis adjustment command from the user 40 via the visual index input means or the control unit 210. Here, optical axis adjustment corresponds to adjusting image positions on the first display 123 and the second display 125 according to vital reaction sensing signals based on the interpupillary distance of the user 40. The optical controller 145 analyzes the received user command, determines the operating range (optical axis adjustment range) using internal hardware and software functions, determines an optical axis movement distance according to the operating range, and sends the movement distance data to the ADC/DAC 143. The ADC/DAC 143 converts the movement distance data into an analog driving signal and sends the analog driving signal to the optical actuator 141. The optical actuator 141 drives an internal VCM motor or other dynamic mechanism so as to physically move the optical axes of the first display 123 and the second display 125, thereby adjusting the central focus according to the interpupillary distance of the user 40. Thereafter, the optical actuator 141 feeds movement distance data of the optical axes back to the ADC/DAC 143. The ADC/DAC 143 converts the movement distance data into digital data and sends the digital data to the optical controller 145.

The optical controller 145 determines an offset 'a' on the basis of the feedback data and sends the offset 'a' to the control unit 210. Alternatively, the optical controller 145 may send the feedback data to the control unit 210, and the control unit 210 may determine an offset 'a' from the feedback data. Using the determined offset 'a', the control unit 210 may assign coordinates to a selection region of the user 40, reconstruct image regions according to the interpupillary distance of the user 40 and send the reconstructed image regions to the first display 123 and the second display 125 as shown in FIG. 6, and assign coordinates for the selection region icon to the vital reaction sensors 133 and 135. Alternatively, the control unit 210 may assign coordinates for a selectable icon only to the vital reaction sensors 133 and 135 as shown in FIG. 5.

Figure 9:
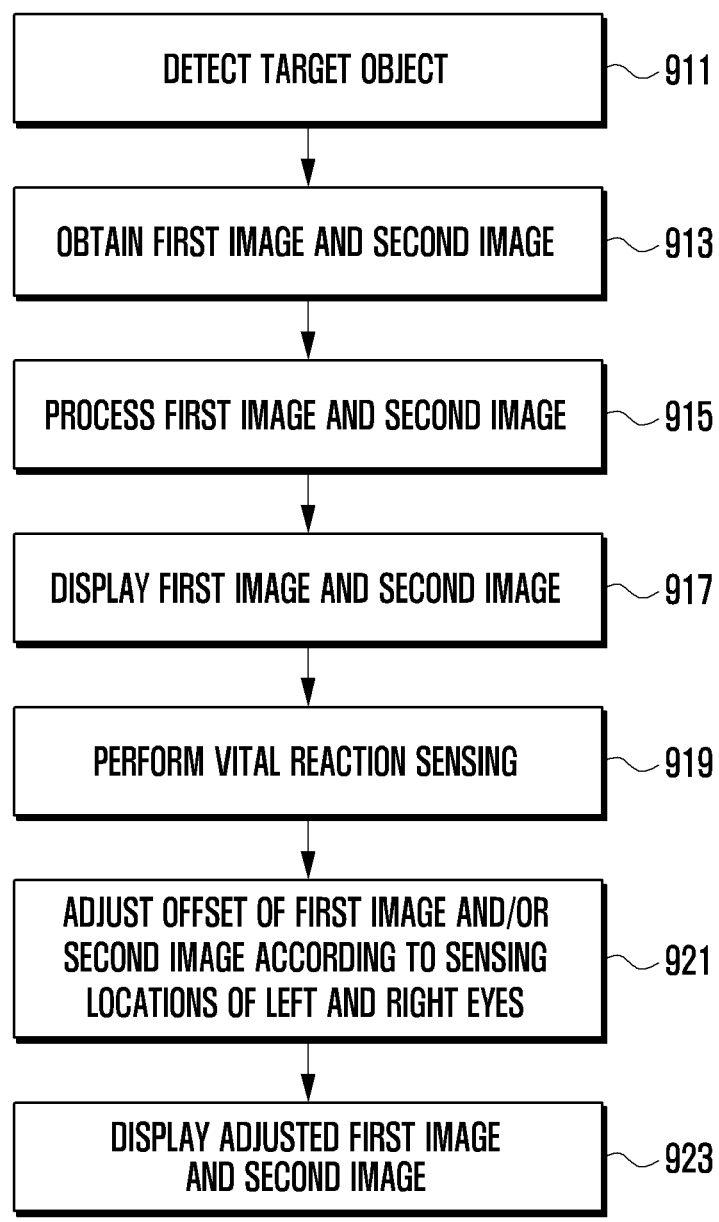
FIG. 9 is a flowchart of an operational procedure for an HMD device according to another exemplary embodiment of the present invention.

FIG. 9 is a flowchart of an operational procedure for an HMD device according to another embodiment of the present invention.

In the HMD device of the exemplary embodiment of the present invention, an image to be displayed is segmented into a first image and a second image, and the first image and second image are displayed respectively on a left display and a right display for the left eye 41 and the right eye 42. Vital reaction changes of the user 40 viewing the left display and right display are detected through vital reaction sensors assigned respectively to the left eye 41 and the right eye 42. When a vital reaction change is detected, an interruption signal containing coordinates of left and right eye positions at the time of detection is generated. In response to the interruption signal, the image positions are adjusted according to a given offset and the received coordinates, and the adjusted images are displayed respectively on the left display and the right display.

Referring to FIG. 9, in the operational procedure of the HMD device, the control unit 210 detects a target object in step 911, and obtains images of the target object in step 913. Here, the obtained image may be an image captured by the camera unit 110. Alternatively, the obtained image may be an image retrieved from an internal memory or an image received through the communication unit 220 or the external interface unit 240 from the external communication environment 20. In this case, step 911 may be skipped.

In the following description, it is assumed that the image is captured by the camera unit 110 having two camera modules for the left eye 41 and the right eye 42; the display unit 120 includes two displays for the left eye 41 and the right eye 42; and the vital reaction sensor unit 130 includes two sensors for the left eye 41 and the right eye 42.

After obtaining a first image and a second image, the control unit 210 processes the first image and second image for display in step 915. Here, the control unit 210 may perform color conversion and scaling, and may encode the images for storage. The control unit 210 forwards the processed first image and second image to the HMD processor 100, which displays the processed first image and second image on the display unit 120 in step 917. Here, image display may be performed using the second approach of FIG. 6.

The control unit 210 controls an operation to perform vital reaction sensing in step 919. Here, when the lines of vision of the user 40 are fixed for a preset time or more, the vital reaction sensor unit 130 generates an interruption signal and sends coordinates of positions indicated by the eyes (visual icon) to the control unit 210. The vital reaction sensor unit 130 may include the optical feedback part 140 of FIG. 8. In this case, the vital reaction sensor unit 130 may determine an offset on the basis of operation results of the optical feedback part 140 according to a user command issued through a visual index input means, and send the offset to the control unit 210. Upon reception of results of vital reaction sensing, the control unit 210 adjust image positions according to sensing locations of the left eye 41 and the right eye 42 as depicted in FIG. 7 in step 921. The control unit 210 outputs the adjusted images to the HMD processor 100, which displays the adjusted images in step 923.

Through repetition of the above steps, the user 40 may view the first image and second image that are well matched to the left eye 41 and the right eye 42.

In a feature of the exemplary embodiment of the present invention, an HMD device is provided that combines an HMD function with input and communication functions. Through modularization, the HMD device may be realized as a technology intensive information and media appliance. The HMD device may become a substitute for various information technology devices having similar functions, and has the potential to be a next generation information technology device through device-user interactions. The HMD device may provide differentiated user experience through seamless integration and logging software, and provide an infotainment feature as a wireless smart terminal Hence, the HMD device may be applied to various fields such as leisure and entertainment. In addition, as the HMD device is portable while being worn on the head in front of the eyes, it may be applied to outdoor, military or medical applications.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described in with reference to certain exemplary embodiments thereof, it will be understood by those skilled in the art that many various changes in form and details may be made therein without departing from the spirit and scope of the invention as defined by the appended claims and their equivalents.

What is claimed is:

1. A Head Mounted Display (HMD) device, the device comprising:
    a display unit including a left display and a right display for a left eye and a right eye configured to display images for the left eye and the right eye;
    a vital reaction sensor unit including a first vital reaction sensor for the left eye and a second vital reaction sensor for the right eye configured to detect vital reaction changes of a user viewing the left display and the right display, and to generating, when a vital reaction change is detected, an interruption signal comprising coordinates of a position of the left eye and the right eye at which the vital reaction change is detected;
    a control unit configured to output images for the left eye and the right eye to the display unit, to control the distance between the left display and the right display, and to adjust, upon generation of the interruption signal, positions of the images according to the received coordinates and a given offset; and
    an optical feedback unit configured to adjust one of a position of the left display and a position of the right display by changing coordinates returned through an optical feedback part from the vital reaction sensors according to the same offset value,
    wherein the control unit is further configured to construct an extended coordinate plane by combining a coordinate plane of the left eye and a coordinate plane of the right eye based on the offset value so that coordinates of positions of the left eye and the right eye are included in the extended coordinate plane as a coordinates of a single position,
    wherein at least one of the coordinate plane of the left eye and the coordinate plane of the right eye is adjusted by adding the offset value before the combining.

2. The device of claim 1, wherein the optical feedback unit comprises:
    an optical controller configured to generate image position adjustment data under control of the control unit, and to determine an offset on the basis of feedback data including movement distance data;
    a converter configured to convert the image position adjustment data into a driving signal, and to convert a feedback signal into digital feedback data; and
    an actuator configured to physically move the optical axis of the display unit according to the driving signal by adjusting the distance between the left display and the right display, and to feed movement distance data back to the converter,
    wherein the optical controller sends an interruption signal comprising an offset value of the moved optical axis on the basis of feedback results.

3. The device of claim 2, wherein the control unit segments an original image into a first image for the left eye and a second image for the right eye, and sends the first image and the second image to the display unit.

4. The device of claim 3, further comprising a camera unit, wherein the camera unit includes camera modules for the left eye and the right eye to capture a first image and a second image of a target object.

5. The device of claim 3, further comprising a communication unit, wherein the communication unit receives image data through a wireless interface from an external communication environment, and forwards the received image data to the control unit.

6. The device of claim 3, further comprising an external interface unit, wherein the external interface unit receives image data from an external device through short-range communication, and forwards the received image data to the control unit.

7. The device of claim 2, further comprising an optical member,
    wherein the control unit outputs an original image, and
    wherein the optical member segments the original image into a first image and a second image through polarization, and sends the first image and the second image to the display unit.

8. An image display method for a head mounted display device, the method comprising:
    segmenting an image to be displayed into a first image and a second image, and displaying the first image and the second image respectively on a left display and a right display for a left eye and a right eye;
    detecting vital reaction changes of a user viewing the left display and the right display through vital reaction sensors assigned respectively to the left eye and the right eye;
    generating, when a vital reaction change is detected, an interruption signal comprising coordinates of a position at which the vital reaction changes are detected;
    adjusting, upon generation of the interruption signal, positions of the images according to received coordinates and a given offset; and
    displaying the adjusted images respectively on the left display and the right display, and adjusting the linear distance between the left display and the right display so that the distance between optical axes thereof is equal to the interpupillary distance of a user on a basis of the coordinates and the given offset, wherein the adjusting of the positions of the images comprises moving the left display and the right display by changing coordinates returned through the optical feedback unit from the vital reaction sensors according to the same offset, wherein the coordinates of the position at which the vital reaction changes are detected are identified by combining a coordinate plane of the left eye and a coordinate plane of the right eye based on the given offset so that coordinates of positions of the left eye and the right eye are included in the extended coordinate lane as coordinates of a single position which corresponds to the coordinates of the position at which the vital reaction changes are detected.

9. The method of claim 8, wherein the displaying of the first image and the second image comprises segmenting an original image into a first image for the left eye and a second image for the right eye, and sending the first image and second image respectively to the left display and the right display.

10. The method of claim 8, wherein the displaying of the first image and the second image comprises segmenting, by an optical member, the original image into a first image and a second image through polarization, and sending the first image and the second image respectively to the left display and the right display.

11. The method of claim 8, further comprising capturing, by camera modules for the left eye and the right eye, a first image and a second image of a target object.

12. The method of claim 8, wherein the detecting of the vital reaction changes comprises generating, by the vital reaction sensors, coordinates of a position at which no vital reaction change is detected for a preset time.

13. The method of claim 12, wherein the detecting of the vital reaction changes is performed by using at least one of an eye tracker, a cornea refraction measurer and a gravity sensor as a vital reaction sensor.

14. The method of claim 8, wherein the displaying of the adjusted images comprises adjusting the position of a corresponding image according to the offset and received coordinates, mapping the images according to sensing locations of the left eye and the right eye, displaying the mapped images respectively on the left display and the right display, and repeating these operations.

15. The method of claim 8, wherein the adjusting of the positions of the images further comprises adjusting polarization of the optical member.

16. A user input method for a head mounted display device, the method comprising:

segmenting an image having one or more selection items into a first image and a second image, and displaying the first image and the second image respectively on a left display and a right display for a left eye and a right eye;

adjusting positions of the first image and the second image by moving the first display and the second display by a given offset according to the interpupillary distance of a user and generating movement distance feedback data;

detecting vital reaction changes of the user viewing the left display and the right display through vital reaction sensors assigned respectively to the left eye and the right eye;

generating, when a vital reaction change is detected, an interruption signal comprising coordinates of positions of the left eye and the right eye at which the vital reaction change is detected;

constructing an extended coordinate plane by combining a coordinate plane of the left eye and a coordinate plane of the right eye based on the offset value so that coordinates of positions of the left eye and the right eye are included in the extended coordinate plane as a coordinate of a single position;

and identifying positions, on the adjusted images and on the extended coordinate plane, corresponding to the portion at which a user selection input is generated, wherein at least one of the coordinate plane of the left eye and the coordinate plane of the right eye is adjusted by adding the offset value before the combining.

17. The method of claim 16, wherein the detecting of the vital reaction changes comprises generating, by the vital reaction sensors, coordinates of the left eye and the right eye positions at which no vital reaction change is detected for a preset time.

18. The method of claim 16, wherein the constructing of the extended coordinate plane comprises adding the given offset to values of a corresponding axis for a first vital reaction sensor, and forming the set union between axis values changed by the given offset for the first vital reaction sensor and axis values not changed by the given offset for a second vital reaction sensor.

19. The method of claim 18, wherein the axis values and the given offset are non-negative integers.

20. The method of claim 16, wherein the combining of the coordinates of the left eye and the right eye positions comprises adding the given offset to coordinates obtained by a first vital reaction sensor, and computing an arithmetic average between the adjusted coordinates of the first vital reaction sensor and coordinates obtained by a second vital reaction sensor as coordinates of a single position on the extended coordinate plane.

* * * * *